United States Patent [19]

Bargain et al.

[11] 3,878,172

[45] Apr. 15, 1975

[54] PROCESS FOR PREPARING HEAT RESISTANT RESIN FROM UNSATURATED BIS-IMIDE AND DIAMINE

[75] Inventors: Michel Bargain, Lyon; André Combet, La Mulatiere; Pierre Grosjean, Sainte-foy-les-Lyon, all of France

[73] Assignee: Rhone-Poulenc S.A., Paris, France

[22] Filed: Feb. 3, 1972

[21] Appl. No.: 223,367

Related U.S. Application Data

[63] Continuation of Ser. No. 885,956, Dec. 12, 1969, abandoned.

[30] Foreign Application Priority Data

Dec. 19, 1968 France .............................. 68.179314

[52] U.S. Cl..... 260/78 UA; 260/47 CZ; 260/47 UA
[51] Int. Cl............................................. C08g 20/20
[58] Field of Search....... 260/78 UA, 47 CZ, 47 UA

[56] References Cited
UNITED STATES PATENTS

| | | | |
|---|---|---|---|
| 2,818,405 | 12/1957 | Kovacic | 260/78 UA |
| 3,380,964 | 4/1968 | Grundschober et al. | 260/78 UA |
| 3,406,148 | 10/1968 | Sambeth et al. | 260/78 UA |
| 3,533,996 | 10/1970 | Grundschober et al. | 260/78 UA |
| 3,652,511 | 3/1972 | Vincent et al. | 260/78 UA |
| 3,669,930 | 6/1972 | Asahara et al. | 260/78 UA |
| 3,740,378 | 6/1973 | Crivello | 260/78 UA |

OTHER PUBLICATIONS

Chemical Abstracts, Vol. 74, 1971, p. 649985.

*Primary Examiner*—Harold D. Anderson
*Attorney, Agent, or Firm*—Stevens, Davis, Miller & Mosher

[57] ABSTRACT

Cross-linked, heat-resistant resins are made by reacting, e.g. by heating together, an unsaturated bis-imide with a diprimary amine in the presence of a strong acid, or an inhibitor of free radicals, or a strong acid and a radical polymerization initiator, or a strong acid and an inhibitor of free radicals.

9 Claims, No Drawings

PROCESS FOR PREPARING HEAT RESISTANT RESIN FROM UNSATURATED BIS-IMIDE AND DIAMINE

This application is a continuation of our application Ser. No. 885,956, filed Dec. 12, 1969, and now abandoned. This invention relates to heat-resistant resins and their preparation.

French Pat. No. 1,555,564 describes new heat-resistant resins obtained by reacting an unsaturated N,N'-bis-imide of the formula:

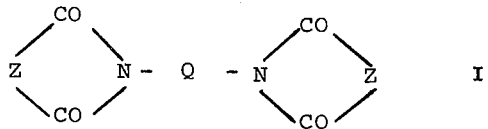

in which Z represents a divalent radical containing a carbon-carbon double bond an Q is a divalent radical containing at least two carbon atoms with a di-primary diamine of the formula:

$$H_2N - T - NH_2 \quad \text{II}$$

in which T is a divalent radical of not more than 30 carbon atoms.

The symbols T and Q may be identical or different and may represent linear or branched alkylene radicals having less than 13 carbon atoms, cycloalkylene radicals with 5 or 6 carbon atoms in the ring, a heterocyclic radical containing at least one of the atoms O, N and S, or a phenylene or polycyclic aromatic radical. These various radicals may carry substituents which do not give undesired sidereactions under the working conditions. The symbols T and Q may also represent a number of phenylene or alicyclic radicals linked directly or by a divalent atom or group such as, for example, oxygen or sulphur, an alkylene group of 1 to 3 carbon atoms, or one of the groups

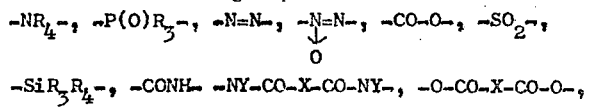

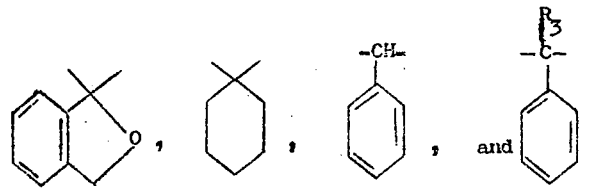

in which $R_3$, $R_4$ and Y each represent alkyl of 1 to 4 carbon atoms or a cycloalkyl radical having 5 or 6 carbon atoms in the ring or a phenyl or polycyclic aromatic radical, and X represents a straight or branched alkylene radical having less than 13 carbon atoms, a cycloalkylene radical having 5 or 6 carbon atoms in the ring, or a mono or polycyclic arylene radical.

The radical Z is derived from an ethylenic anhydride of general formula:

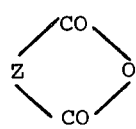

which can for example be maleic anhydride, citraconic anhydride, tetrahydrophthalic anhydride, itaconic anhydride and the products of Diels-Alder reaction between a cyclodiene and one of these anhydrides.

Suitable N,N'-bis-imides of formula I which can be used are N,N'-ethylene-bis-maleimide, N,N'-hexamethylene-bis-maleimide, N,N'-meta-phenylene-bis-maleimide, N,N'-p-phenylene-bis-maleimide, N,N'-4,4'-diphenylmethane-bis-maleimide, N,N'-4,4'-diphenylether-bis-maleimide, N,N'4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide and N,N'-4,4'-diphenylcyclohexane-bis-maleimide.

Examples of diamines of formula II which can be used are 4,4'-glamino-dicyclohexylmethane, 1,4-diaminocyclohexane, 2,6-diaminopyridine, m-phenylenediamine, p-phenylene diamine, 4,4'-diamino-diphenyl-methane, 2,2-bis(4-aminophenyl)-propane, benzidine, 4,4'-diaminophenyl ether, 4,4'-diaminodiphenyl sulphide, 4,4'-diamino-diphenylsulphone, bis-(4-aminophenyl)diphenylsilane, bis-(4-aminophenyl)-methylphosphine oxide, bis-(3-aminophenyl)methylphosphine oxide, bis-(4-aminophenyl)-phenylphosphine oxide, bis-(4-aminophenyl)phenylamine, 1,5-diamino-naphthaline, m-xylyenediamine, p-xylylenediamine, 1,1-bis(p-aminophenyl)phthalan and hexamethylenediamine.

The relative amounts of N,N'-bis-imide and of diamine are chosen so that the ratio $$\frac{\text{number of mols of N,N'-bis-imide}}{\text{number of mols of diamine}}$$

is greater than 1 and between 1.2:1 and 50:1, preferably between 1.3:1 and 5:1.

The preparation of the resins according to French Pat. No. 1,555,564 can be carried out in an inert polar diluent such as dimethylformamide, N-methylpyrrolidone or dimethylacetamide. A solvent is advantageously employed when the application of the polymer formed requires the use of a solution because the process makes it possible to obtain directly solutions in which the solids content can be very high.

The preparation can also be carried out in bulk, by heating the reagents which have beforehand been intimately mixed. Depending on the physical state of the reagents present, conventional techniques for mixing finely divided solids may be employed or a solution or a dispersion of one of the reagents in the other, kept in the liquid state may be prepared. For many uses it is advantageous first to heat the mixture of the two reagents to a moderate temperature of the order of 100° to 250°C. for several minutes to several hours. The prepolymer thus obtained can then be used in solution in a solvent such as those mentioned above or in suspension in an inert diluent, or it can be shaped by simple hot casting, or it can be used as a powder. In a second stage, the hardening of the prepolymer can be brought about by heating to temperatures of the order of 350°C., optionally under pressure.

It is also possible to impart the shape of the desired object directly to the mixture and to effect the hardening by heating, optionally under pressure.

The resins according to French Pat. No. 1,555,564 infusible and insoluble. They are remarkably resistant to heat stresses, possess good dielectric properties and have excellent stability to chemical agents. They can be converted to multicellular materials, or can be used for bonding metals. They are of particular value for the preparation of laminates based on mineral fibres or of moulded objects, optionally in combination with fibrous or pulverulent fillers.

The present invention is an improvement in the process of preparation of the resins of French Pat. No. 1,555,564. In the new improved process the reaction between the bis-imide of formula I and the diamine of formula II is carried out in the presence of a strong acid or of an inhibitor of free radicals. In the present application, the ratio $$\frac{\text{number of mols of N,N'-bis-imide}}{\text{number of mols of diamine}}$$

is preferably between 1.2:1 and 50:1, especially 1.3:1 to 5:1.

The new process is of very special value where the resins are prepared in two stages. The choice of one or other additive (acid or inhibitor) depends essentially on the application for which the resin is intended.

Thus the use of a strong acid is particularly advantageous for preparing powders which can be used to prepare moulded objects because it allows the various manipulations required in this type of application to be carried out at a very high cycle speed. By strong acids, are meant monoacids or polyacids in the Brönstead sense, of which at least one of the groups has an ionisation constant pKa of less than 4.5. These acids may be mineral acids such as hydrochloric, sulphuric, nitric or phosphoric acid, optionally substituted by an organic radical, as in sulphonic and phosphonic acids. The acids may also be carboxylic acids which may be of a simple structure or possess groups which do not interfere with the reaction between the bis-imide and the diamine. Other suitable strong acids are listed in the working examples. None of the strong acids disclosed herein and in the parent application Ser. No. 885,956 have a carboxylic acid radical attached directly to a cyclic carbon atom. The preferred acid is maleic acid. Weights of acid from 0.5 to 5 percent based on the weight of the bis-imide employed are generally used. The acid can optionally be combined with a small amount, ranging for example from 0.01 to 2 percent by weight based on the bis-imide, of a radical polymerisation initiator such as lauroyl peroxide, azobisisobutyronitrile or diazabicyclooctane.

An inhibitor of free radicals is especially valuable for the production of prepolymers intended to be used as solutions or in the fused state, for example for producing composite materials or for moulding by casting. In effect, the prepolymer solutions obtained have increased resistance to oxidation by atmospheric oxygen and their viscosity remains practically constant during storage at ordinary temperature. The use of an inhibitor also considerably extends the period for which the prepolymer can be kept in the fused state, which makes it possible to carry out moulding by casting without being dependent on the sensitivity of the liquid state of the material being shaped.

Hydroquinone, picric acid or N,N-diphenyl-N'-picryihydrazine are preferably used as the inhibitor, in proportions by weight which are identical to those mentioned above for the initiator. The inhibitor can optionally be combined with a strong acid such as defined above, in the proportions already indicated, principally for producing prepolymers intended for the manufacture of laminated assemblies.

The Examples which follow illustrate the invention.

EXAMPLE 1

89.5 g. of N,N'-4,4'-diphenylmethane-bis-maleimide are intimately mixed with 19.8 g. of bis-(4-aminophenyl)methane, 1.79 g. of maleic acid and 0.179 g. of azobisisobutyronitrile. This mixture is heated to 160°C. for 20 minutes. After cooling, the prepolymer is ground and placed in a cylindrical mould (diameter 76 mm; height 6 mm). The mould is placed between the platens of a press previously heated to 250°C. and the whole is compressed under a pressure of 200 kg./cm². After 15 minutes, the object is removed from the mould while hot and then cut into samples (length: 37.5 mm, width: 9.57 mm.) which at 25°C. have a flexural breaking strength of 12.6 kg./mm² for a span of 25.4 mm.

EXAMPLE 2

This Example illustrates the influence of various acids, optionally combined with azobisisobutyronitrile, on the duration of prepolymerisation of a homogeneous mixture prepared from 8.9 g. of N,N'-4,4'-diphenylmethane-bis-maleimide, 1.98 g. of bis-(4-aminophenyl)methane and acid in the proportions indicated. The various operations are carried out under otherwise identical conditions. In each operation, the vessel containing the mixture is heated in a fluid kept at 150°C. The mixture melts and its viscosity then increases containing with time until it solidifies. For each acid in question, the time which elapses between starting to heat the mixture and the moment where the mixture solidifies is determined. The precision of the test is of the order of a minute.

Table I below summarizes the results obtained.

TABLE I

| Nature of the acid | Percentage by weight based on the bis-maleimide | Length prepolymerisation (minutes) |
|---|---|---|
| Without acid | | 60 |
| Monochloroacetic acid | 1.5 | 12 |
| Dichloroacetic acid | 1.5 | 12 |
| Bis-maleamic acid of formula (a): 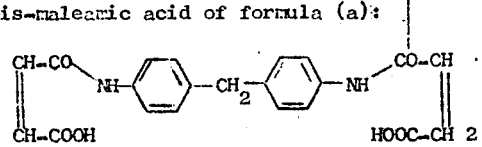 | | 28 |

TABLE I—Continued

| Nature of the acid | Percentage by weight based on the bis-maleimide | Length prepolymerisation (minutes) |
|---|---|---|
| Bis-maleamic acid of formula (b): 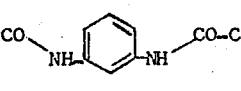 | 2 | 30 |
| Bis-maleamic acid of formula (c): 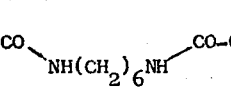 | 2 | 18 |
| Maleic acid | 1 | 18 |
| Maleic acid | 4 | 9 |
| Fumaric acid | 1 | 25 |
| Maleic acid + azobisisobutyronitrile | 2  0.1 | 5 |
| Bis-maleamic acid of formula (a) + azobisisobutyronitrile | 2  0.2 | 11 |

EXAMPLE 3 a. 89.5 g. of N,N'-4,4'-diphenylmethane-bis-maleimide are intimately mixed with 19.8 g. of bis-(4-aminophenyl)methane, 0.179 g. of picric acid and 1.79 g. of maleic acid. The mixture is heated to 150°C. for 30 minutes. After cooling, the prepolymer is ground and then dissolved in 190 g. of N-methylpyrrolidone.

A laminated assembly is prepared with 79 g. of the solution thus obtained, in the manner described in Example 4 of French Pat. No. 1,555,564. This laminate possesses the following properties at 25°C.:

resin content 22%
flexural breaking strength 53 kg./mm²

The remaining solution was stored in light and without special precautions. During this storage, its colour and viscosity showed practically no change.

b. An intimate mixture prepared from 8.95 g. of N,N'-4,4'-diphenylmethane-bis-maleimide, 1.98 g. of bis-(4-aminophenyl)methane and 0.018 g. of picric acid is heated to 150°C. After 2 minutes, the mixture liquifies and is still in the liquid form after 45 minutes under these temperature conditions.

If the picric acid is replaced by the same amount of N,N-diphenyl-N'-picrylhydrazine the mixture is still in the liquid state after 1 hour at 150°C.

IF no inhibitor is used, the mixture becomes pasty after 17 minutes at 150°C. and at this stage can already not be used for moulding by casting.

We claim:

1. In a process for the preparation of a resin by heating to 100°C to 350°C. an unsaturated bis-imide of formula:

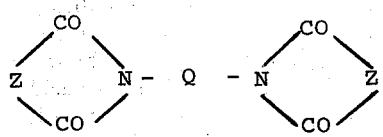

with a diamine of the formula:
H₂N — T — NH₂ in a mole ratio from 1.2:1 to 50:1, in which Z represents a divalent radical containing a carbon-carbon double bond derived from an ethylenic anhydride of the formula:

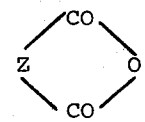

and each of Q and T, which may be the same or different, represents a linear or branched alkylene radical having less than 13 carbon atoms, a cycloalkylene radical with 5 or 6 carbon atoms in the ring, a heterocyclic radical containing at least one of the atoms oxygen, nitrogen and sulphur, a phenylene or polycyclic aromatic radical, or a plurality of phenylene or alicyclic radicals linked directly or by a divalent oxygen or sulphur atom, an alkylene group of 1 to 3 carbon atoms, or one of the groups $-NR_4-$, $-P(O)R_3-$, $-N=N-$, $-\overset{O}{\overset{\uparrow}{N}}=N-$, $-CO-O-$, $-SO_2-$, $-SiR_3R_4-$, $-CONH-$, $-NY-CO-X-CO-NY-$, $-O-CO-X-CO-O$,

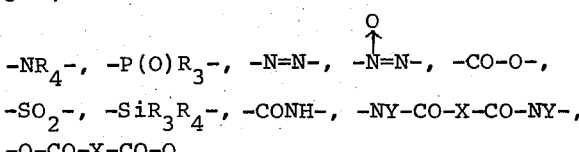

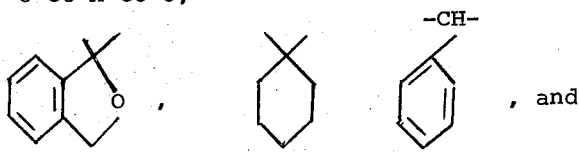

in which $R_3$, $R_4$ and Y each represent alkyl of 1 to 4 carbon atoms or a cycloalkyl radical having 5 or 6 carbon atoms in the ring or a phenyl or polycyclic aromatic radical, and X represents a straight or branched alkylene radical having less than 13 carbon atoms, a cycloalkylene radical having 5 or 6 carbon atoms in the ring, or a mono or polycyclic arylene radical, the improvement which comprises carrying out the reaction in the presence of from 0.5 to 5 percent by weight based on the weight of the bis-imide of a strong acid having a $pK_a$ of less than 4.5 having no carboxylic acid radical attached directly to a cyclic carbon atom or from 0.01 to 2 percent by weight of the bis-imide of an inhibitor of free radicals.

2. The improvement according to claim 1 in which the said reaction is effected in the presence of the said strong acid and of a radical polymerisation initiator.

3. The improvement according to claim 1 in which the said reaction is effected in the presence of the said acid and of the said inhibitor of free radicals.

4. The improvement according to claim 2 in which the proportion of the said radical polymerization initiator is 0.01 to 2 percent by weight of the bis-imide.

5. The improvement according to claim 1 in which Z is derived from maleic, citraconic, tetrahydrophthalic or itaconic anhydride or from the Diels-Adler reaction product between one of the said anhydrides and a cyclodiene.

6. The improvement according to claim 1, in which the said inhibitor of free radicals is picric acid, hydroquinone, or N,N-diphenyl-N'-picrylhydrazine.

7. The improvement according to claim 1 in which the strong acid is maleic acid, momochloroacetic acid, dichloroacetic acid, fumaric acid, or an acid of formula:

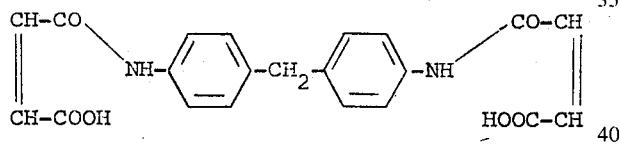

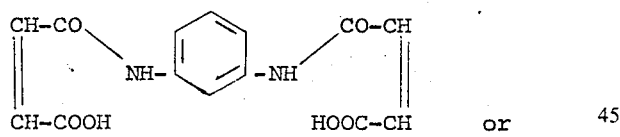

or

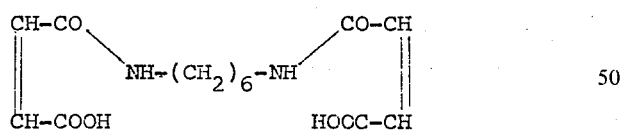

8. The improvement according to claim 1 in which the strong acid is hydrochloric, sulphuric, nitric, phosphoric, a sulphonic or phosphonic acid, maleic, monochloroacetic, dischloroacetic or fumaric acid or an acid of formula:

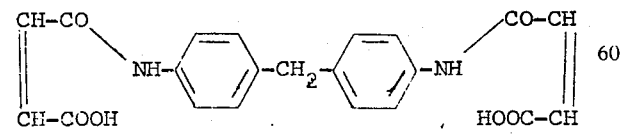

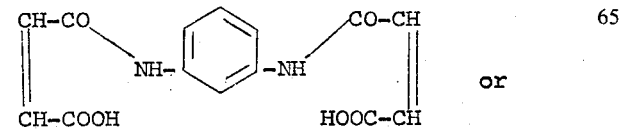

or

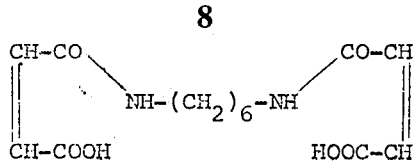

9. In a process for the preparation of a resin by heating to 100°C to 350°C an unsaturated bis-imide of formula:

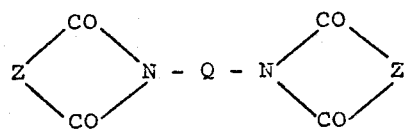

with a diamine of the formula:

$$H_2N-T-NH_2$$

in a mole ratio from 1.2:1 to 50:1, in which Z represents a divalent radical containing a carbon-carbon double bond derived from an ethylenic anhydride of the formula:

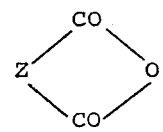

and each of Q and T, which may be the same or different, represents a linear or branched alkylene radical having less than 13 carbon atoms, a cycloalkylene radical with 5 or 6 carbon atoms in the ring, a heterocyclic radical containing at least one of the atoms oxygen, nitrogen and sulphur, a phenylene or polycyclic aromatic radical, or a plurality of phenylene or alicyclic radicals linked directly or by a divalent oxygen or sulphur atom, an alkylene group of 1 to 3 carbon atoms, or one of the groups $-NR_4-$,

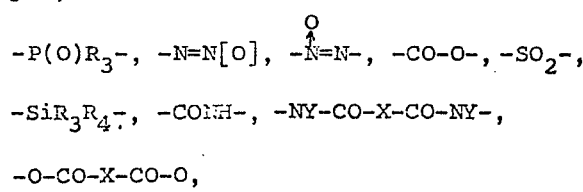

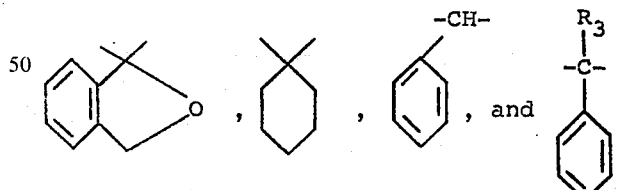

in which $R_3$, $R_4$ and Y each represent alkyl of 1 to 4 carbon atoms or a cycloalkyl radical having 5 or 6 carbon atoms in the ring or a phenyl or polycyclic aromatic radical, and X represents a straight or branched alkylene radical having less than 13 carbon atoms, a cycloalkylene radical having 5 or 6 carbon atoms in the ring, or a mono or polycyclic arylene radical, the improvement which comprises carrying out the reaction in the presence of from 0.5 to 5 percent by weight based on the weight of the bis-imide of a strong acid having a $pK_a$ of less than 4.5 and having no carboxylic acid radical attached directly to a cyclic carbon atom selected from hydrochloric, sulphuric, nitric, phosphoric, sulphonic or phosphonic acid, maleic, monochloroacetic, dichloroacetic or fumaric acid, an acid of formula:
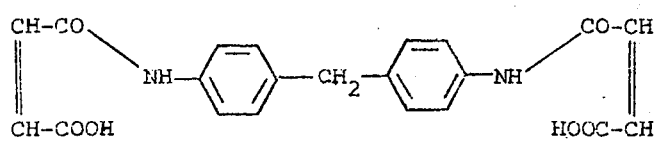
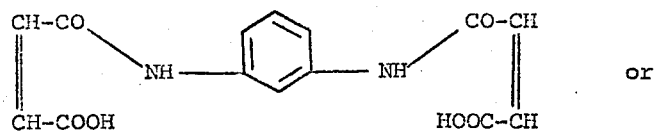
or
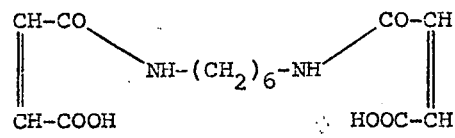
or from 0.1 to 2 percent by weight of the bis-imide of an inhibitor of free radicals.
* * * * *